March 19, 1968   J. A. VOLL ET AL   3,373,662
ZERO TRAVEL VACUUM SUSPENDED BRAKE BOOSTER
Filed April 15, 1965   2 Sheets-Sheet 1

INVENTORS
James A. Voll
George E. Kellogg
BY
Donald P. Selwicki
THEIR ATTORNEY

March 19, 1968 J. A. VOLL ETAL 3,373,662
ZERO TRAVEL VACUUM SUSPENDED BRAKE BOOSTER
Filed April 15, 1965 2 Sheets-Sheet 2

INVENTORS
James Q. Voll
George E. Kellogg
BY
Donald P. Selvek
THEIR ATTORNEY

United States Patent Office 3,373,662
Patented Mar. 19, 1968

3,373,662
ZERO TRAVEL VACUUM SUSPENDED BRAKE BOOSTER
James A. Voll, Dayton, and George E. Kellogg, Miamisburg, Ohio, assignors to General Motors Corporation, Detroit, Mich., a corporation of Delaware
Filed Apr. 15, 1965, Ser. No. 448,345
2 Claims. (Cl. 91—434)

This invention relates to vehicle braking apparatus and more particularly to a vacuum suspended power booster for use with vehicle brakes.

Brake boosters that are commonly referred to as zero travel boosters have certain inherent problems associated therewith. These boosters are very often of the vacuum-suspended type and a valve mechanism is utilized to vent atmospheric pressure into a negatively pressurized chamber. This results in an extremely high proportionate increase of pressure in that chamber, resulting in a very effective power multiplication between the force needed to move the valve and the output force generated by the booster. However, very little force is necessary to position the valve and, therefore, a high boost can be generated with very little force applied. It is extremely easy to overapply a force and, consequently, mechanism producing a "feel" in the system is necessary. Typically, this "feel" is provided by the use of springs acting against the actuating members, but certain problems associated with springs cause this method to be not completely acceptable.

It is an object of the present invention to provide an improved vacuum-suspended power booster which utilizes atmospheric air vented into a booster housing to react against an input force to provide a "feel" for the system.

It is another object of the present invention to provide an improved vacuum-suspended brake booster which is responsive to a pressure build-up proportionate to the output of the booster and includes means for allowing a predetermined initial pressurization of the system before a reaction is felt by an operator.

It is still another object of the present invention to provide an improved vacuum-suspended brake booster which incorporates at atmospheric-responsive reaction mechanism disposed around the power piston in the brake booster thereby conserving space therein.

It is a further object of the present invention to provide an improved vacuum-suspended brake booster which is constructed so that the power piston is piloted on the valve body and the reaction mechanism is incorporated into the mechanism in a compact and efficient manner.

Further objects and advantages of the present invention will be apparent from the following description, reference being had to the accompanying drawings wherein a preferred embodiment of the present invention is clearly shown.

Figure 1:
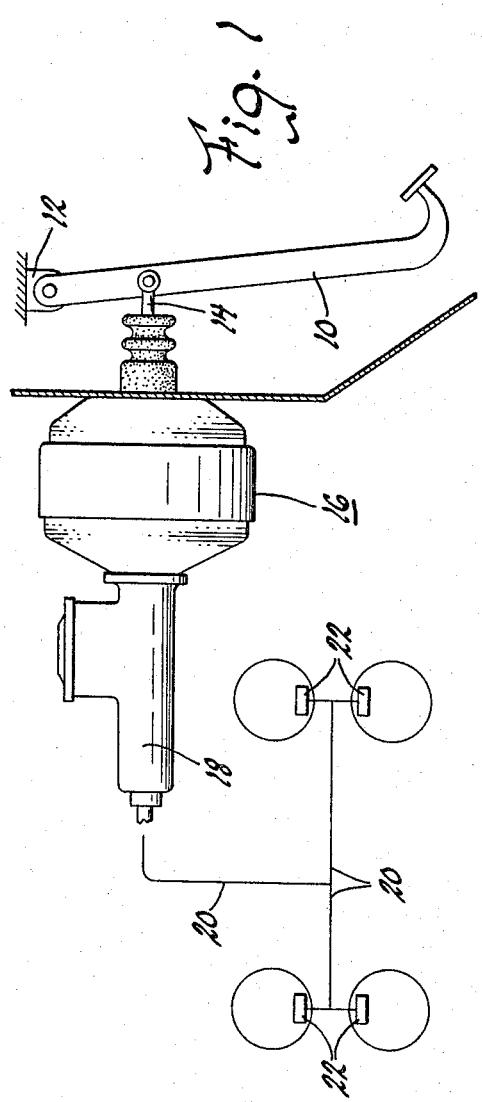
FIGURE 1 is a diagrammatic sketch of a vehicle brake system, the subject invention being shown in its operative environment.

Referring to FIGURE 1, a pedal 10 is shown pivotally supported by a fixed portion 12 of a vehicle. The pedal 10 is pivotally connected to a push rod 14 which serves as an input member for a booster, generally designated by numeral 16. A brake master cylinder 18 is carried on the front end of the booster 16 and receives an output force therefrom. Master cylinder 18 communicates a fluid under pressure through lines 20 to wheel brake cylinders 22 in a conventional manner.

Figure 2:
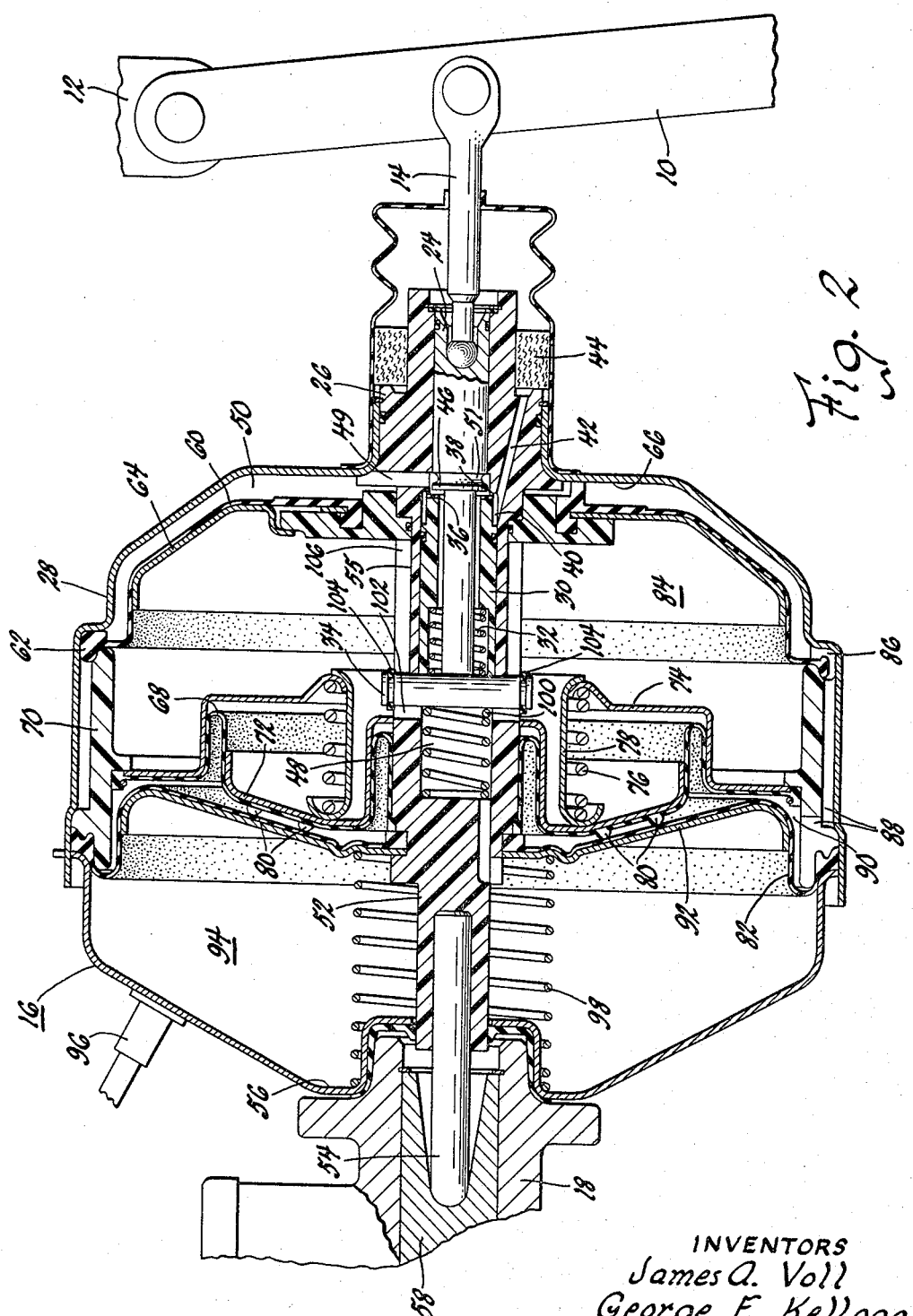
FIGURE 2 is a sectional view of the subject invention shown in a poised position.

Referring now to FIGURE 2, push rod 14 drivably engages an air valve 24. Air valve 24 is slidably disposed in element 26 which serves as a closure member for housing 28. Floating valve 30 is biased toward element 26 by spring 32 bearing against reaction rod 34. Floating valve 30 has a resilient member 36 carried on one end thereof which is adapted to selectively engage seat 38 carried by element 26. Chamber 40 communicates with the atmosphere through passage 42 and air filter 44. It is understood that chamber 40 is at atmospheric pressure.

Flange 46 formed on air valve 24 is adapted to engage a portion of resilient member 36, thereby shutting off vacuum communication between chamber 48 and chamber 50. It is therefore clear that movement of air valve 24 leftwardly, as viewed in FIGURE 2, first results in the closing of flange 46 against member 36 cutting off vacuum input to chamber 50. Further movement of flange 46 against member 36 displaces floating valve 30 to the left, thereby exposing chamber 50 to atmospheric pressure from chamber 40 communicated through passage 49 and peripheral groove 51 on air valve 24.

Power piston 52 carrying output rod 54 is piloted on surface 55 which is a cylindrical extension of element 26 and enclosed valves 24 and 30. Power piston 52 is slidably disposed through wall 56 of housing 28 at a point contiguous to the section of housing 28 carrying master cylinder 18. Output rod 54 operatively engages pressurizing piston 58 of master cylinder 18.

Diaphragm 60 is peripherally held in area 62 by the co-operation of housing 28 and element 70, and is axially carried by power piston 52. Diaphragm support 64 is carried by power piston 52 and serves to offer rigidity and support to diaphragm 60. It is noted that chamber 50 is formed between diaphragm 60 and wall 66 of housing 28.

Diaphragm 68 is peripherally carried by locking element 70 in turn carried against housing 28. Diaphragm 68 is axially carried by power piston 52. Diaphragm 68 is supported by support member 72 also carried on power piston 52. Diaphragm 68 is also supported at another end by cage 74. Reaction spring 76 is compressible between cage 74 and spring retainer 78. Raised portions 80 integrally formed with diaphragm 68 serve to statically separate diaphragm 68 from diaphragm 82. Chamber 84 is formed between diaphragm 60 and diaphragm 68 and is constantly under vacuum pressure. Passage 86 formed in diaphragm 60 and passage 88 formed in locking element 70 provide a path for fluid communication between chamber 50 and reaction chamber 90 formed between diaphragm 82 and diaphragm 68.

Diaphragm 82 held by support 92 forms chamber 94 when viewed in conjunction with wall 56. Vaccum inlet 96 communicates a negative pressure into chamber 94 from any appropriate vacuum source, such as the intake manifold of a vehicle. Spring 98 is compressed between wall 56 and support 92 to provide a return means for power piston 52.

Spring 100 is disposed in chamber 48 and bears against reaction rod 34 and also serves as a return means for air valve 24. Reaction rod 34 is disposed in oversized aperture 102 through power piston 52 and has peripherally disposed resilient members 104 carried on either end thereof to bear against the outer wall of piston means 52 to retain rod 34 in its operative location. Slots 106 are provided in opposed walls of power piston 52 that are circumferentially disposed on wall 55 to provide access for rod 34 as power piston 52 slides relatively thereto during actuation of said booster.

In operation, referring to FIGURE 2, a force is exerted by the vehicle operator against pivotally supported pedal 10. It is understood that a certain inherent mechanical advantage exists in the mounting of pedal 10 and this effective force is transmitted through push rod 14 to air valve 24. Air valve 24 is immediately displaced to the left, as viewed in FIGURE 2, until flange 46 contacts resilient member 36. This is an exhaust valve and effectively prevents further communication of vacuum from chamber 94 to chamber 50. It should be noted that chambers 94, 90, 84 and 50 are under vacuum pressure while pedal 10 is in the poised position. It is also noted that the cut-off of vacuum to chamber 50 results in an immediate cut-off of vacuum to chamber 90, chambers 50 and 90 being at the same pressure due to fluid communication established through passages 86 and 88.

Further movement of air valve 24 results in flange 46 leftwardly displacing floating valve 30 against the tension of spring 32. It is understood that the initial movement of valve 24 produced a force against reaction rod 34 and, consequently, spring 100. This resulted in reaction rod 34 being moved toward one extremity of aperture 102.

As floating valve 30 is displaced to the left, as viewed in FIGURE 2, resilient member 36 is drawn off seat 38, thereby communicating the pressure in chamber 40 through groove 51 and passage 49 to chamber 50. As previously stated, chamber 40 is always at atmospheric pressure due to the communication of chamber 40 with the atmosphere through passage 42.

Chamber 50 will be increasingly positively pressurized as long as resilient member 36 remains off seat 38. The increasingly positive pressurization of chamber 50 is communicated through passages 86 and 88 into chamber 90 known as the reaction chamber. An effective force is placed against diaphragm 82 and diaphragm 68 resulting in a displacement to the right of support member 72 against spring retainer 78 and, ultimately, against the force of spring 76. It is clear that the compressed force of spring 76 must be overcome before any relative movement of diaphragm 68 takes place. It should also be noted that reaction rod 34 was driven to a point near support member 72 and, upon initial movement of diaphragm 68 and support 72, a reverse or reaction force will be placed on air valve 24.

As pressure builds up in chamber 50, diaphragm 60 is displaced toward the left, as viewed in FIGURE 2, against the negative pressure in chamber 84. Since diaphragm 60 and support 64 are carried by power piston 52, the result is a movement of power piston 52 to the left, as viewed in FIGURE 2. Movement of power piston 52 results in movement of output rod 54 therewith and, consequently, a force is exerted on piston 58 of master cylinder 18. The pressure buildup in chamber 50 will continue as long as floating valve 30 and resilient member 36 are off seat 38. However, it is clear that an increasing buildup of pressure in chamber 50 results in a corresponding buildup of pressure in chamber 90 and, finally, support member 72 moves against resilient member 104 carried on reaction rod 34, resulting in a movement of rod 34 against valve 30 and valve 24. This will result in the reseating of resilient member 36 against seat 38, thereby cutting off further influx of atmospheric pressure from chamber 40.

Figure 3:
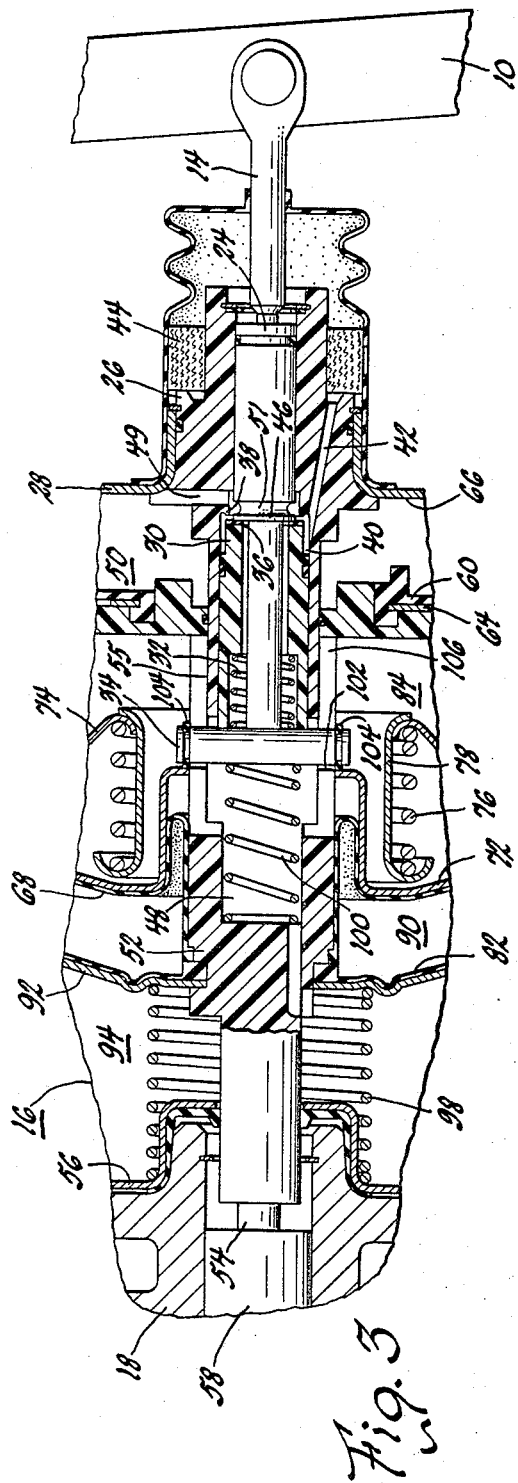
FIGURE 3 is a partial sectional view of the subject invention with the operative parts of the booster shown in an actuated position.

Referring to FIGURE 3, the internal valve mechanism is illustrated in substantially the configuration the internal valve parts would assume during a time when chambers 50 and 90 are positively pressurized. It is noted that power piston 52 has moved against the force of spring 98, and support 64 and diaphragm 60 are moved relative to wall 56. It is noted that the view in FIGURE 3 illustrates the configuration of the valve mechanism prior to the time the reaction force has become great enough to seat resilient member 36 on seat 38. Therefore, in this view, chambers 50 and 90 are still being increasingly positively pressurized.

The subject invention has the feature of being very easily manually operated in the event of a vacuum pressure failure. When no vacuum is available in booster 16, an actuating movement of pedal 10 displaces air valve 24 to the left in much the same manner as under periods of powered operation. The end of valve 24 contacting reaction rod 34 drives rod 34 against the force of spring 100 and into the left extremity of aperture 102. Power piston 52 is thereby engaged and a further movement of pedal 10 results in push rod 54 moving piston 58 of master cylinder 18, thereby pressurizing lines 20 in an unpowered manner.

Brake release is effected under periods of powered operation by releasing the input force on pedal 10. Spring 100 urges reaction rod 34 and air valve 24 back to a position of rest. Spring 32 repositions floating valve 30 against seat 38 and flange 26 withdraws from resilient member 36. Atmospheric pressure communication is cut off between chamber 40 and passage 49. Chamber 50 is immediately placed under a negative pressure and atmospheric air previously vented thereinto is evacuated therefrom. As pressure in chamber 50 decreases, pressure in chamber 90 decreases and spring 76 drives diaphragm 68 to a position of rest against diaphragm 82 and spring 98 repositions power piston 52 to a poised position seen in FIGURE 2. In this manner, the power cycle, previously described, is completed.

After a manual actuation of the brake booster and pressure is released from pedal 10, spring 98 returns power piston 52 to a poised position and spring 100 completes the return by exerting a force against reaction rod 34 and air valve 24.

The present invention has the important feature of having a preloaded and caged reaction spring 76 which force must be overcome before a reaction force is felt against reaction rod 34. The device can be calibrated so that this delay can be used to pressurize the brake system and ready the system for immediate brake actuation or can be allowed to initiate a brake actuation before a reaction is actually felt against pedal 10. In this manner, the brake booster and associated brake system can be as responsive as the designer cares to make it.

Another feature worthy of note is the piloting of the power piston on wall 55 of support element 26. The valve means is contained therein and wall 55 is actually a container therefor. Piloting of the power piston throughout its travel results in very stable forward and backward movement of the power piston. This inevitably results in longer life for the associated parts and very positive operation of the system.

Upraised portions 80 on diaphragm 68 maintain a spacing between diaphragm 68 and diaphragm 82 allowing a free flow of modulated air therebetween. Reaction rod 34 is likewise retained by the same resilient members 104 that act as bumpers for contacting by support member 72 during powered operation and a portion of the power piston during extreme movement during unpowered operation. The compact relationship and floating capability of the reaction mechanism relative to the power piston is also viewed as a very important advance in the art contributing to the overall invention disclosed herein.

While the embodiment of the present invention, as herein disclosed, constitutes a preferred form, it is to be understood that other forms might be adopted.

What is claimed is as follows:

1. A brake booster comprising: a housing carried by a fixed portion of a vehicle; a vacuum inlet to said housing from a vacuum pressure source; an inlet into said housing for communicating atmospheric pressure thereinto; power piston means movably supported by said housing and adapted to transfer an output force to a brake master cylinder; valve means slidably disposed in said housing and arranged to selectively route vacuum and atmospheric pressures to portions of said housing in response to an input force, said valve means acting as a pilot for said power piston means during movement thereof; and a plurality of diaphragms peripherally carried by said housing and being centrally carried by said power piston means, thereby separating said housing into several compartments individually pressurizable, at least one of said diaphragms being responsive to atmospheric pressure and including means for imparting a force on said valve means thereby effectively increasing the input force necessary to obtain a given output force at the brake master cylinder, said last named means includes a pin slidably carried by said power piston means and responsive to movement of one of said diaphragms to impose a force on said valve means during an actuating movement thereof which is transmitted as a resistance to the actuating force acting on said valve means, said pin has a plurality of peripherally disposed resilient bumpers serving to retain said pin in said power piston means and as a shock absorber when contacted by said diaphragm during movement thereof in response to a pressure increase.

2. A brake booster comprising: a housing carried by a fixed portion of a vehicle; power piston means slidably carried by said housing and being in driving engagement with a brake master cylinder; actuator means pivotally supported by a fixed portion of a vehicle and pivotable toward said housing; valve means slidably carried in a wall of said housing and operatively engaged by said actuator means, said valve means piloting said power piston means during movement thereof; inlet means carried by said housing and arranged to communicate in a selective manner negative and positive pressure into selected areas within said housing; diaphragm means disposed in spaced apart relationship and being axially carried by said power means and peripherally engaging said housing; and reaction means responsive to movement of one of said diaphragm means to impart a proportionally lesser pressure on said valve means than provided by said actuator means, the spaced apart diaphragm means forming a plurality of chambers within said housing which are selectively negatively and positively pressurizable by movement of said valve means to multiply an input force from said actuator means and exert multiplied force on a brake master cylinder through said power piston means, at least two of said diaphragm means being maintained in spaced apart disposition by raised portions integrally formed with at least one of said diaphragm means under operating conditions when pressure against said diaphragm means is minimal, said diaphragm means having said raised portions being positively pressurizable during an application of an input force to exert a reaction force against said actuator means thereby effectively proportionately decreasing the input force, said power piston means including a cylindrical portion adapted to slidably engage said valve means whereby said power piston means is piloted during periods of time when a multiplied output force is applied to a brake master cylinder, said cylindrical portion having opposed slots carrying a reaction pin in a disposition wherein an input force through said valve means is exerted thereon and a reaction force is exerted thereon by said diaphragm means having raised portions thereon, said reaction pin being slidably retained in the slots in said cylindrical portion by resilient members peripherally engaging said reaction pin near opposed ends thereof thereby retaining said reaction pin in the slots in said cylindrical portion.

References Cited

UNITED STATES PATENTS

| | | | |
|---|---|---|---|
| 2,197,075 | 4/1940 | Fitzgerald | 91—372 |
| 3,075,499 | 1/1963 | Prather | 91—434 |
| 3,152,518 | 10/1964 | Ayers | 91—434 |
| 3,155,012 | 11/1964 | Ayers | 91—434 |

MARTIN P. SCHWADRON, *Primary Examiner.*

PAUL E. MASLOUSKY, *Examiner.*